Figure 1:
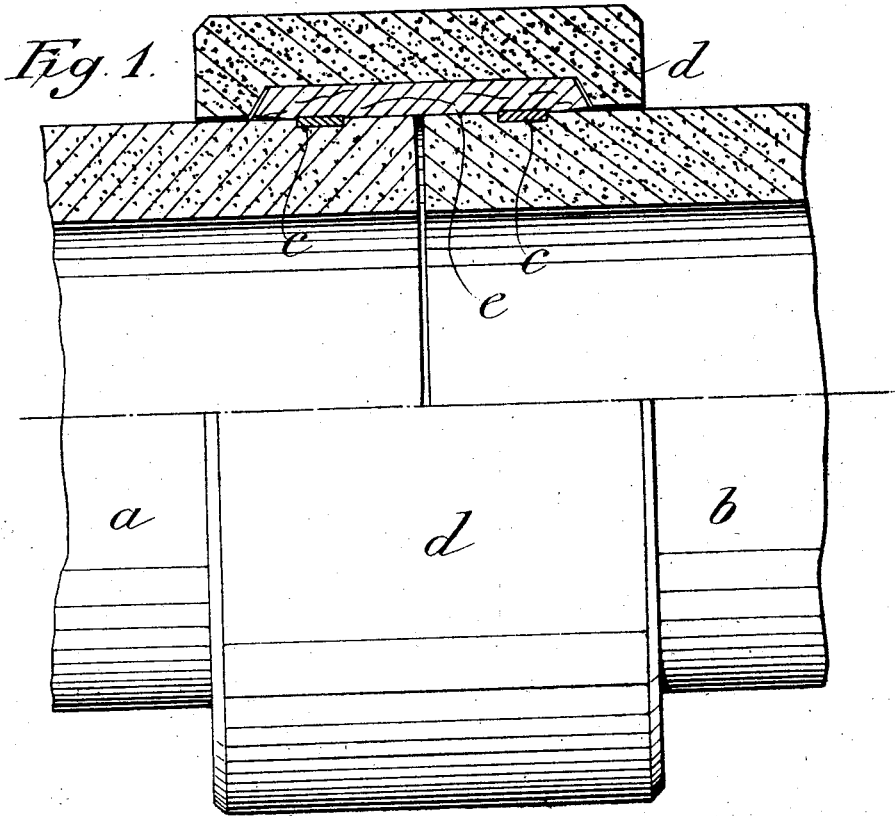

Feb. 19, 1924. 1,484,355

D. MOIR ET AL
JOINT FOR CONCRETE PIPES AND THE LIKE
Filed Sept. 27, 1922  3 Sheets-Sheet 1

INVENTORS
Donald Moir
Hugh Buchanan
BY Julian C. Dowell
ATTORNEY

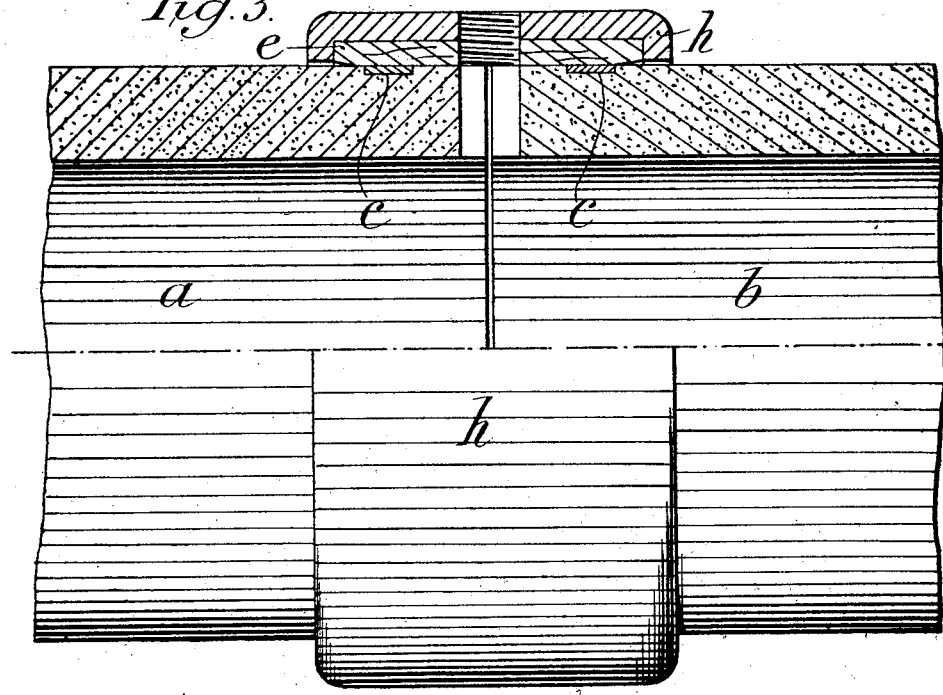
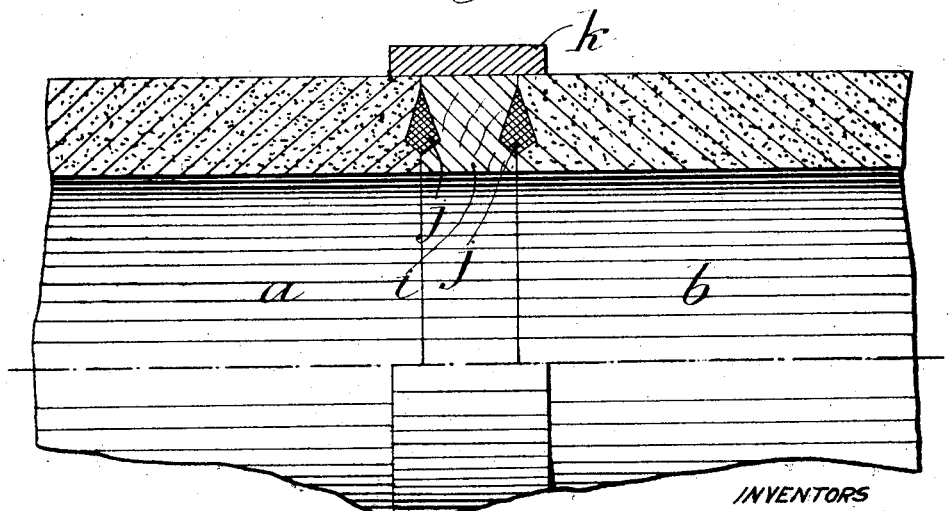

Feb. 19, 1924. 1,484,355
D. MOIR ET AL
JOINT FOR CONCRETE PIPES AND THE LIKE
Filed Sept. 27. 1922 3 Sheets-Sheet 3

INVENTORS
Donald Moir
Hugh Buchanan
BY Julian C. Dowell
ATTORNEY

Patented Feb. 19, 1924.

1,484,355

UNITED STATES PATENT OFFICE.

DONALD MOIR AND HUGH BUCHANAN, OF ROSARIO DE SANTA FE, ARGENTINA.

JOINT FOR CONCRETE PIPES AND THE LIKE.

Application filed September 27, 1922. Serial No. 590,920.

*To all whom it may concern:*

Be it known that we, DONALD MOIR and HUGH BUCHANAN, subjects of the King of Great Britain and Ireland, residing, respectively, at Rosario de Santa Fe, Argentina, have invented Improvements in Joints for Concrete Pipes and the like, of which the following is a specification.

The success of a concrete pipe line conveying liquid under pressure is dependable to a great extent on the ability of the joints to maintain impermeability under the varying conditions met with in practice. As a result of temperature variation the pipe will either expand or contract according as the temperature rises or falls and therefore a certain amount of longitudinal movement in the joints must be possible if severe stresses in the pipe line are to be avoided. Further, as a result of bad ground, defective workmanship in laying, or other causes parts of the pipe line may sink down or otherwise deviate from the original alignment and to meet this condition, the joint must possess a certain degree of flexibility. Other factors of importance are ease and rapidity in placing, strength to resist internal pressure, durability and so forth.

Many forms of joints are known in which use is made of wooden packing rings with the object of securing liquid tightness due to the swelling of the wood and other forms of packing comprising hollow circular rings of wood, rubber and the like have been proposed having combined therewith material or substance capable of being expanded or swollen by liquids or gases so as to provide a tight joint between the casing and pipe or the like.

The object of the present invention is to provide improved jointing means according to which a ring of solid section made of material capable of absorbing moisture and swelling has combined therewith at least one annular elastic sealing element so arranged that a portion of the ring aforesaid is presented or exposed at two sides of the sealing element or each element to the surface or surfaces intended to be rendered liquid tight, the said means being particularly applicable to the jointing of concrete pipes as already referred to although the same may be used for connecting metal or other pipes, conduits or tanks or other articles having cylindrical ends allied to pipe ends.

A joint according to the invention may take various forms as will be readily understood from accompanying drawings, Figs. 1 to 5 of which illustrate partly in elevation and partly in section five different modifications.

Fig. 1 shows one arrangement for jointing together two straight ended pipes $a$, $b$. Here each pipe is provided with a circumferential groove near its extremity into which is placed an elastic ring $c$ of rubber or other suitable material. $d$ is a sleeve or collar of reinforced concrete which may however be of metal or other material having an annular recess on its interior surface which is occupied by a wood ring $e$ or filled with other material capable of absorbing moisture and increasing in volume. The interior diameter of the wood ring $e$ or equivalent is such that the pipes can just enter freely and the sealing rings $c$ are made to project slightly beyond the surface of the pipes. The collar being fitted with the expansive material $e$ and the elastic rings $c$ being placed around the grooves on the pipe, the joint is made by slipping the collar over the end of one pipe a distance equal to half the length of the collar. The next pipe is then introduced a like distance from the opposite side of the collar until the pipe ends almost butt. Upon completion of the pipe line in this manner, water is turned on causing the element $e$ to increase in volume or swell, with the result that the elastic material $c$ is firmly pressed between the pipe and the material $e$ and a watertight joint is thus secured.

Figure 2:
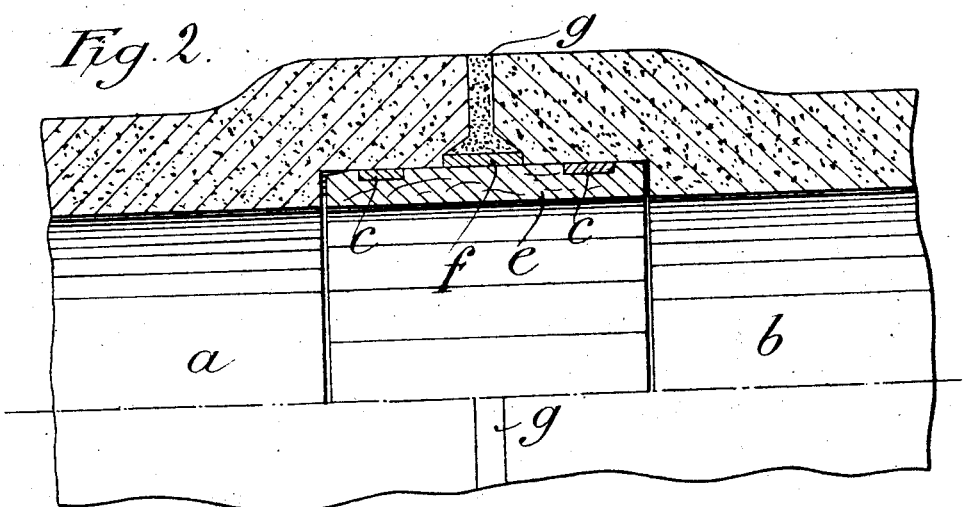

The arrangement shown in Fig. 2 is similar in principle but applied to the interior instead of the exterior of the pipe. In this joint either a built up or a solid ring constituting the expansive element is enclosed and held together by a metal ring $f$ and is provided with two grooves into which are fitted the sealing rings $c$. To receive the joint the ends of the pipes are enlarged and suitable reinforcement is provided to withstand the outward radial pressure produced by the joint upon absorbing moisture. To protect the metal ring $f$ against corrosion the space between the pipe ends may be filled with cement mortar $g$.

Fig. 3 illustrates the manner in which a service connection (in the case of domestic water supply) can be taken off a reinforced concrete main the concrete collar $d$ of Fig. 1 being replaced by a metal collar $h$ which is drilled and tapped to accommodate a suitable ferrule or fitting to which the service pipe can be connected.

Fig. 4 shows the jointing means applied between pipe ends, which are formed with grooves of any desired shape. A ring $i$ of wood or other suitable material, and of exterior and interior diameters corresponding to those of the pipes to be jointed, has similar grooves on its opposite faces into which are placed the elastic elements $j$. For the purpose of centering the pipes when laying and likewise for holding together and strengthening the ring $i$ a metal ring $k$ is provided as shown. The joint is made as follows: The parts $i$, $j$, $k$, being first assembled as a unit, this is introduced between the pipe ends as shown and the two pipes are pressed together. In a long pipe line several jointing units would be so placed and these would then be closed by means such as a jack applied to the end of the last pipe of the section. After completing the pipe line water is turned on and by absorption the rings $i$ will increase in volume longitudinally tightly pressing the sealing elements $j$ against the pipe ends. Service connections can be taken from a joint of this type with the greatest of ease and in a manner similar to that shown in Fig. 3.

Figure 5:
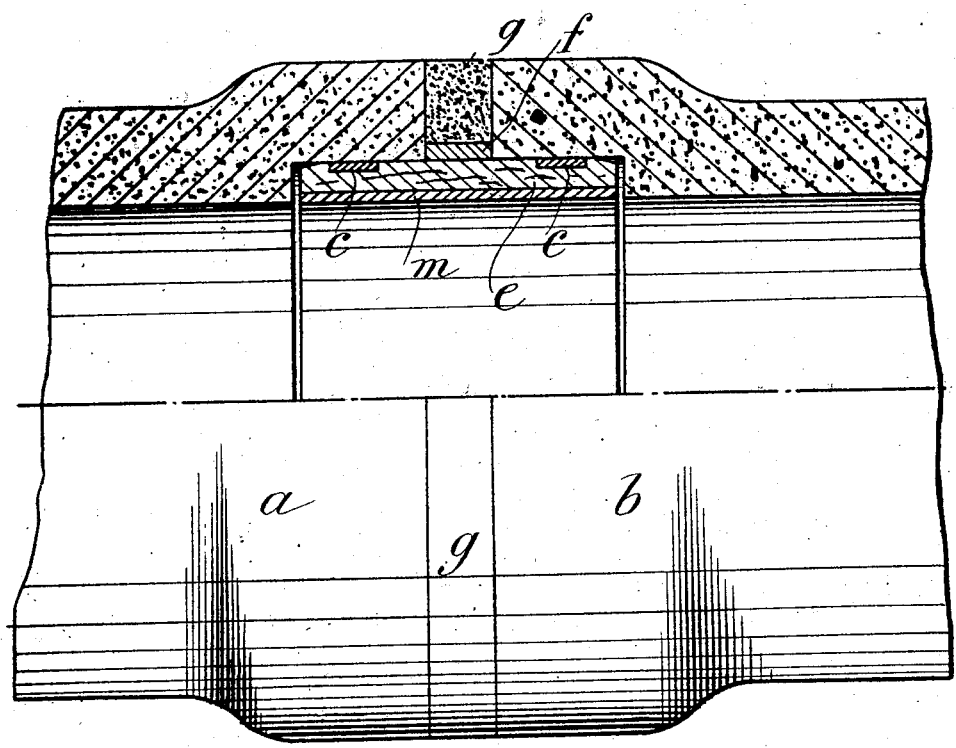

The joint shown in Fig. 5 is similar to that of Fig. 2, with the exception that an interior metal sleeve $m$ is provided as indicated. This type of joint is especially suitable for relatively high pressures the expansive element $e$ being efficiently protected and strengthened to resist the pressure which it may have to withstand.

What we claim is:—

1. In a pipe joint, an annular member capable of absorbing moisture and swelling, and an elastic sealing ring in direct contact therewith, the material of the annular member aforesaid being exposed at both sides of the elastic ring to the surface with which the joint is to be made and the resultant increase in volume of the annular member due to swelling causing the same to compress the elastic ring upon the said surface and also to directly engage said surface at each side thereof.

2. The combination with a pipe end, of an encircling member, an annular member capable of absorbing moisture and swelling arranged within and engaging the encircling member, and an elastic sealing ring interposed between the absorbent member and the pipe end, the material of the absorbent member being exposed at both sides of the elastic ring to the pipe surface and the resultant increase in volume of the absorbent member due to swelling causing the same to compress the elastic ring upon the pipe surface and also to directly engage the pipe at each side thereof.

3. The combination with two pipe ends, of two axially separated elastic rings and a single annular member of absorbent material to which moisture has access, the material of the absorbent member being exposed at both sides of each elastic ring to one pipe end and the resultant increase in volume of the absorbent member due to swelling causing the same to press the elastic rings against the respective pipe ends and also to directly engage the pipe ends at each side of each ring.

4. The combination with two pipe ends, of two axially separated elastic rings and a single annular member of absorbent material to which moisture has access, the material of the absorbent member being exposed at both sides of each elastic ring to the cylindrical surface of one pipe end and the resultant increase in volume of the absorbent member due to swelling, causing the same to compress the elastic rings radially against the cylindrical surfaces of both pipe ends aforesaid and also to directly engage such surfaces at each side of each ring.

Signed at Rosario, Argentina, this 29th day of August, 1922.

DONALD MOIR.
HUGH BUCHANAN.